3,196,159
(AMINOALKYLENEOXY)-PHENYL ALCOHOLS
William Laszlo Bencze, Summit, N.J., assignor to
Ciba Corporation, a corporation of Delaware
No Drawing. Filed Sept. 29, 1959, Ser. No. 843,071
14 Claims. (Cl. 260—296)

The present invention concerns tertiary alcohols and derivatives thereof. More particularly, it relates to compounds of the formula:

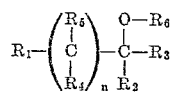

in which each of the radicals $R_1$ and $R_2$ represents a biphenylyl radical, a monocyclic carbocyclic aryl or a monocyclic heterocyclic aryl radical, with the proviso that at least one of the radicals $R_1$ and $R_2$ stands for a biphenylyl radical, $R_3$ stands for a monocyclic carbocyclic aryl radical, substituted by tertiary amino-lower alkoxy of the formula —O—A—Z, in which Z represents a tertiary amino group and A a lower alkylene radical, each of the radicals $R_4$ nad $R_5$ represents hydrogen or lower alkyl, and $R_6$ hydrogen or acyl, and $n$ stands for one of the numbers 0, 1 or 2, salts and quaternary ammonium compounds, as well as process for the preparation thereof.

A biphenylyl radical, representing $R_1$ and/or $R_2$ may be unsubstituted or may contain in any of the available positions one or more than one substituent, which may be of the same or of different type. These substituents may be, for example, lower alkyl, e.g., methyl, ethyl, n-propyl, isopropyl, n-butyl, tertiary butyl and the like, etherified hydroxyl, such as lower alkoxy, e.g., methoxy, ethoxy and the like, etherified mercapto, such as lower alkyl-mercapto, e.g., methylmercapto, ethylmercapto and the like, nitro, amino, such as primary amino, secondary amino, for example, N-lower alkyl-amino, e.g., N-methylamino, N-ethylamino and the like, or tertiary amino, for example, N,N-di-lower alkyl-amino, e.g., N,N-dimethylamino, N,N-diethylamino and the like, halogen e.g., fluorine, chlorine or bromine and the like, or halogeno-lower alkyl, e.g., trifluoromethyl, or similar groups. More especially, biphenylyl radicals are represented by the formula

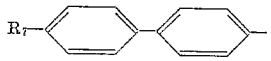

in which $R_7$ represents hydrogen lower alkyl, e.g., methyl, ethyl and the like, lower alkoxy, e.g., methoxy, ethoxy and the like, halogen, e.g., fluorine, chlorine or bromine and the like, or halogeno-lower alkyl, e.g., trifluoromethyl and the like.

$R_1$ and $R_2$, whenever standing for a monocyclic carbocyclic aryl radical, may be represented by phenyl or phenyl substituted by lower alkyl, e.g., methyl, ethyl, n-propyl, isopropyl, n-butyl, tertiary butyl and the like, etherified hydroxyl, such as lower alkoxy, e.g., methoxy, ethoxy and the like, or lower alkylenedioxy, e.g., ethylenedioxy, etherified mercapto, such as lower alkylmercapto, e.g., methylmercapto, ethylmercapto and the like, nitro, amino, such as primary amino, secondary amino, for example, N-lower alkyl-amino, e.g., N-methylamino, N-ethylamino and the like, or tertiary amino, particularly N,N-di-lower alkyl-amino, e.g., N,N-dimethylamino, N,N-diethylamino and the like, halogen, e.g., fluorine, chlorine or bromine and the like, or halogeno-lower alkyl, e.g., trifluoromethyl and the like; such substituents may be attached to any of the available positions, and one or more than one of the same or different groups may be present in the radical. Monocyclic carbocyclic aryl represents more especially the radical of the formula

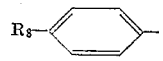

in which $R_8$ stands for hydrogen, lower alkyl, e.g., methyl, ethyl and the like, lower alkoxy, e.g., methoxy, ethoxy and the like. halogen, e.g., fluorine, chlorine, bromine and the like, or halogeno-lower alkyl, e.g., trifluoromethyl and the like.

A monocyclic heterocyclic aryl radical $R_1$ and $R_2$ contains as hetero atoms sulfur, and/or particularly nitrogen atoms. One or more hetero atoms, particularly nitrogen atoms, may be part of the monocyclic heterocyclic aryl nucleus, which contains five, or advantageously six atoms as ring members. Six membered monocyclic heterocyclic aryl radicals are, for example, pyridyl radicals, e.g., 2-pyridyl, 3-pyridyl or 4-pyridyl, as well as 3-pyridazinyl, 4-pyridazinyl, 2-pyrimidyl, 4-pyrimidyl, 2-pyrazinyl and the like. The heterocyclic nucleus is preferably unsubstituted; possible substituents are, for example, lower alkyl, e.g., methyl, ethyl, n-propyl, isopropyl, n-butyl, tertiary butyl and the like, lower alkoxy, e.g., methoxy, ethoxy and the like, or halogen, e.g., fluorine, chlorine, bromine and the like. These substituents may be located in any of the available positions and one or more than one of the same or different groups may be present. A monocyclic heterocyclic aryl radical may be represented more especially by the radical Py representing a pyridyl radical, which is unsubstituted or which may contain lower alkyl, e.g., methyl, ethyl and the like, as substituents.

The monocyclic carbocyclic aryl radical $R_3$ is substituted by a tertiary amino-lower alkoxy group of the formula —O—A—Z, which may be located in any of the available positions. Preferably, the monocyclic carbocyclic aryl radical contains the groups of the formula

—O—A—Z attached to the 4-position.

In a tertiary amino-lower alkyl radical of the formula —A—Z the tertiary amino group Z is particularly an N,N-di-lower hydrocarbon-amino, an N,N-alkylene-imino, an N,N-oxa-alkylene-imino or an N,N-aza-alkylene-imino group. Lower hydrocarbon radicals of an N,N-di-lower hydrocarbon-amino group are, for example, lower alkenyl, lower cycloalkyl, carbocyclic aryl, carbocyclic aryl-lower alkyl, or primarily lower alkyl radicals containing from one to seven carbon atoms. Such radicals are, for example, methyl, ethyl, n-propyl, isopropyl, n-butyl, isobutyl, n-pentyl, neopentyl, allyl, methallyl, cyclopentyl, cyclohexyl, phenyl, benzyl, 1-phenylethyl, 2-phenylethyl and the like, N,N-di-lower hydrocarbon-amino groups are, therefore, represented, for example, by N,N-di-lower alkyl-imino, e.g., N,N-dimethylamino, N-ethyl-N-methyl-amino, N,N-diethylamino, N,N-dipropylamino, N,N-diisopropylamino and the like, as well as by N-cyclopentyl-N-methyl-amino, N-cyclohexyl-N-methyl-amino, N-benzyl-N-methyl-amino, N-methyl-N-(2-phenylethyl)-amino and the like. The alkylene portion of N,N-alkylene-imino, N,N - oxa - alkylene-imino or N,N-aza-alkylene-imino groups contain preferably from four to six carbon atoms as ring members. These groups are represented, for example, by pyrrolidino radicals, e.g., pyrrolidino, 2-methyl-pyrrolidino and the like, piperidino radicals, e.g., piperidino, 2-methyl-piperidino, 3-methyl-piperidino, 4-methyl-piperidino, 3-hydroxy-piperidino, 3-acetoxy-piperidino, 3-hydroxymethyl-piperidino and the like, hexamethylene-imino, morpholino, or piperazino radicals, e.g., 4-methyl-piperazino, 4-hydroxyethyl-piperazino, 4-acetoxy-ethyl-piperazino and the like.

The lower alkyl portion A of a tertiary amino-lower alkyl radical of the formula —A—Z represents a lower alkylene radical, which contains from two to seven, preferably from two to three carbon atoms and separates the tertiary amino group from the oxygen atom of the tertiary amino-lower alkoxy group of the formula —O—A—Z by at least two, preferably by from two to three, carbon atoms. Lower alkylene radicals representing the group A are, therefore, primarily 1,2-ethylene, 1-methyl-1,2-ethylene, 2-methyl - 1,2 - ethylene or 1,3-propylene; other radicals are, for example, 1,4-butylene, 1,5-pentylene, 1,4-pentylene and the like.

In addition to the substituent —O—A—Z, the monocyclic carbocyclic aryl group $R_3$ may contain one or more than one other substituent, which may be attached to any of the available positions. Such substituents are, for example, lower alkyl, e.g., methyl, ethyl n-propyl, isopropyl, n-butyl, tertiary butyl and the like, lower alkoxy, e.g., methoxy, ethoxy and the like, lower alkylenedioxy, e.g., methylenedioxy, lower alkyl-mercapto, e.g., methylmercapto, ethylmercapto and the like, nitro, amino, such as, for example, tertiary amino, for example, N,N-di-lower alkyl-amino, e.g., N,N-dimethylamino and the like, halogen, e.g., fluorine, chlorine, bromine and the like; or halogeno-lower alkyl, e.g., trifluoromethyl, and the like.

The group $R_3$ may be represented, for example, by the radical of the formula

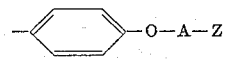

in which A stands for an alkylene radical containing from two to three carbon atoms and separating group Z, representing N,N-di-lower alkyl-amino, from the oxygen atom by from two to three carbon atoms.

The radicals $R_4$ and $R_5$, apart from standing primarily for hydrogen, may represent lower alkyl, e.g., methyl, ethyl and the like.

$R_6$ stands advantageously for hydrogen. It may also represent an acyl group, particularly the acyl radical of a lower aliphatic carboxylic acid, such as a lower alkanoic acid, e.g., acetic, propionic, butyric, pivalic acid and the like. Also anticipated are acyl radicals of lower alkyl carbonic acids, e.g., ethyl carbonic acid and the like, lower alkenoic acids, e.g., acrylic, methacrylic acid and the like, lower alkynoic acids, e.g., propiolic acid and the like, lower cycloalkanoic acids, e.g., hexahydrobenzoic acid and the like, or lower cycloalkyl-lower alkanoic acids, e.g., cyclopentylpropionic, cyclohexylacetic acid and the like; these lower aliphatic carboxylic acids may contain additional substituents, such as, for example, lower alkyl, e.g., methyl, ethyl, n-propyl, isopropyl, n-butyl, tertiary butyl and the like, lower alkoxy, e.g., methoxy, ethoxy and the like, halogen, e.g., fluorine, chlorine, bromine and the like, or N,N-di-lower alkyl-amino, e.g., N,N-dimethylamino, N,N-diethylamino and the like. Other acyl groups may be those of carbocyclic aryl carboxylic acids, such as monocyclic or bicyclic carbocyclic aryl carboxylic acids, e.g., benzoic or naphthoic acids, which may contain as additional substituents lower alkyl, e.g., methyl, ethyl, n-propyl, isopropyl, n-butyl, tertiary butyl and the like, lower alkoxy, e.g., methoxy, ethoxy and the like, lower alkylenedioxy, e.g., methylenedioxy, lower alkyl-mercapto, e.g., methylmercapto, ethylmercapto and the like, nitro, amino, such as tertiary amino, for example, N,N-di-lower alkyl-amino, e.g., N,N-dimethylamino and the like, halogen, e.g., fluorine, chlorine, bromine and the like, or halogeno-lower alkyl, e.g., trifluoromethyl, and the like. Other acyl radicals may be those of carbocyclic aryl-lower aliphatic carboxylic acids, such as monocyclic carbocyclic aryl-lower alkanoic acids, e.g., phenylacetic, dihydrocinnamic acid and the like, or monocyclic carbocyclic aryl-lower alkenoic acids, e.g., cinnamic acid and the like; the carbocyclic aryl nuclei of such acids may be unsubstituted or may contain as substituents those previously described as possibly being present in the carbocyclic aryl portion of carbocyclic aryl carboxylic acids. Furthermore, acyl radicals of heterocyclic aryl carboxylic acids, such as monocyclic heterocyclic aryl carboxylic acids, e.g., nicotinic, isonicotinic, furoic or thienoic acid, may also represent the radical $R_6$.

The symbol $n$ in the formula represents one of the numbers 0, 1 and 2; whenever one of the radicals $R_1$ and $R_2$ stands for a monocyclic heterocyclic aryl radical, the symbol $n$ represents advantageously 1 or 2.

Salts of the compounds of this invention are particularly therapeutically acceptable acid addition salts with inorganic acids, particularly mineral acids, e.g., hydrochloric, hydrobromic, sulfuric, phosphoric acids and the like, or with organic acids, for example, organic carboxylic acids, such as acetic, propionic, glycolic, lactic, pyruvic, succinic, maleic, hydroxymaleic, dihydroxymaleic, fumaric, maleic, tartaric, citric, benzoic, cinnamic, mandelic, salicyclic acid and the like, or organic sulfonic acids, e.g., methane sulfonic, ethane sulfonic, 2-hydroxyethane sulfonic acid and the like. Mono- or poly-salts may be formed, depending on the number of salt-forming groups present in the molecule.

Quaternary ammonium derivatives of the compounds of this invention are particularly those with lower alkyl halides, e.g., methyl, ethyl, propyl or isopropyl chloride, bromide or iodide and the like, lower alkyl lower alkane sulfonates, e.g., methyl or ethyl methane or ethane sulfonate and the like, or lower alkyl hydroxy-lower alkane sulfonates, e.g., methyl 2-hydroxyethane sulfonate and the like. Also included as quaternary ammonium compounds are the quaternary lower alkyl ammonium hydroxides, and the salts of such quaternary lower alkyl ammonium hydroxides with inorganic acids other than hydrohalic acids, such as, for example, sulfuric or phosphoric acid, or with organic carboxylic or sulfonic acids, such as with those described hereinbefore as being suitable for the preparation of acid addition salts. Mono- or poly-quarternary ammonium compounds may be formed, depending on the number of tertiary amino groups present in the molecule.

A resulting compound containing one or more than one asymmetric carbon atom may be obtained in the form of a racemate or a mixture of racemates, respectively. The latter may be separated into the single racemates, which may be resolved into the antipodes as will be shown hereinbelow.

The compounds of the present invention exhibit anti-uterotropic or anti-estrogenic effects. They can, therefore, be used, for example, as anti-fertility agents to prevent the fertilization of the ovum.

In addition, the compounds of this invention cause a reduction of the cholesterol level in the blood of hypercholesterolemic animals, and are, therefore, useful in lowering the level of cholesterol in the body.

Furthermore, upon treatment with the compounds of this invention, an effect on the output of adrenocortical hormones can be observed; the production of some of these hormones is increased, whereas that of others is decreased. The alteration of the adrenocortical hormone balance has been found to be an excellent diagnostic method, particularly to locate malfunctioning of the pituitary-adrenal system.

Particularly pronounced activities are shown by compounds of the formulae

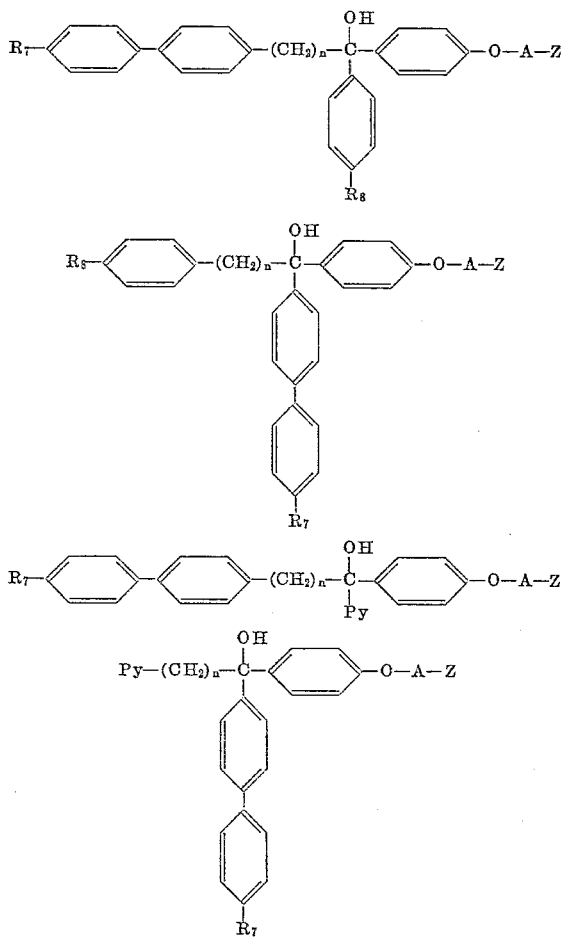

in which formulae each of the groups $R_7$ and $R_8$ represents hydrogen, lower alkyl, especially methyl, lower alkoxy, primarily methoxy, halogen, particularly fluorine, chlorine or bromine, or halogeno-lower alkyl, advantageously trifluoromethyl, Py represents a pyridyl group, $n$ stands for one of the numbers 0, 1 or 2, Z stands for N,N-di-lower alkyl amino and A represents an alkylene radical containing from two to three carbon atoms and separating the N,N-di-lower alkyl-amino group Z from the oxygen atom by from two to three carbon atoms, and therapeutically useful acid addition salts with mineral acids, lower alkane carboxylic acids, lower alkene dicarboxylic acids or lower hydroxy-alkane dicarboxylic acids.

The compounds of this invention may be used as medicaments in the form of pharmaceutical preparations, which contain the new compounds or salts thereof in admixture with a pharmaceutical organic or inorganic, solid or liquid carrier suitable for enteral, e.g., oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in the solid form, for example, as capsules, tablets, dragées and the like, or in liquid form, for example, as solutions, suspensions, emulsions and the like. If desired, they may contain auxiliary substances, such as preserving agents, stabilizing agents, wetting or emulsifying agents, salts for varying the osmotic pressure or buffers and the like. They may also contain in combination, other therapeutically useful substances.

The compounds of this invention may be obtained by reacting a ketone of the formula:

in which $R_2$ and $R_3$ have the previously-given meaning, with an organo-metallic reagent of the formula:

in which $R_1$, $R_4$, $R_5$ and $n$ have the previously-given meaning, and $M^{\oplus}$ represents the positively charged ion of certain metals of the IA-group of the Periodic System or the positively charged ion of the formula Met-Hal$^{\oplus}$, in which Met represents certain divalent metals of the IIA-group and the IIB-group of the Periodic System, and Hal stands for halogen, and, if desired, acylating in a resulting compound the tertiary hydroxyl group, and/or, converting a resulting salt into the free base, and/or, if desired, converting a free base into a salt or a quaternary ammonium compound thereof, and/or, separating a resulting mixture of racemates of compounds having more than one asymmetric carbon atom into the single racemates, and/or, resolving a resulting racemate into the antipodes.

In the above-mentioned reagent of the formula:

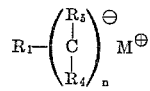

$M^{\oplus}$ represents primarily the positive ion of an alkali metal, such as sodium, or particularly lithium, or the positive ion of the formula Mg-Hal$^{\oplus}$, in which Hal represents a halogen, e.g., chlorine, bromine or iodine, atom. Alkali metal derivatives are preferably used with those compounds, in which $R_1$ represents a monocyclic heterocyclic aryl radical, each of the radicals $R_4$ and $R_5$ represents hydrogen or lower alkyl and $n$ stands for 1, or in which $R_1$ stands for a biphenylyl or a monocyclic carbocyclic aryl radical, at least one of the radicals $R_4$ and $R_5$ represents lower alkyl and $n$ stands for 1, whereas the magnesium halide-type reagent (Grignard reagent) is useful with all other compounds, particularly those in which $R_1$ stands for a biphenylyl radical or a monocyclic carbocyclic aryl radical, both radicals $R_4$ and $R_5$ represent hydrogen, and $n$ represents 0, 1 or 2, or those, in which $R_1$ represents a monocyclic heterocyclic aryl radical, $R_4$ and $R_5$ represent hydrogen and $n$ stands for 1, or more especially for 2.

Both types of reagents are used under similar conditions; preferably, the alkali metal compound or the Grignard reagent is prepared separately and is then reacted with the ketone. The diluent used during the preparation of the reagent, especially the Grignard reagent, for example, a di-lower alkyl ether, particularly diethylether, may be diluted or replaced by other solvents, for example, by other ethers, such as monocyclic carbocyclic aryl lower alkyl ethers, e.g., anisole and the like, bis-monocyclic carbocyclic aryl ethers, e.g., diphenyl ether and the like, cyclic ethers, e.g., tetrahydrofuran, p-dioxane and the like, organic bases, e.g., pyridine, N-methyl-morpholine and the like, monocyclic carbocyclic aryl hydrocarbons, e.g., benzene, toluene, xylene and the like, or aliphatic hydrocarbons, e.g., pentane, hexane and the like, or any other suitable solvent. The reaction may be carried out and completed under cooling, at room temperature, or while heating, and, if necessary, the atmosphere of an inert gas, e.g., nitrogen, may be required, particularly when an alkali metal reagent is used.

The resulting reaction mixture may be worked up according to known methods. Thus, a complex resulting from the reaction of a ketone with a Grignard reagent may be broken, for example, by adding a weak acid, such as an aqueous solution of ammonium chloride and the like, to the reaction mixture. The desired product may be isolated by extraction, absorption and elution, distillation, crystallization and the like, and purified by recrystallization, salt formation and the like, depending on the physical appearance of the desired compound and/or its stability.

The starting materials used in the above reaction are known or, if new, may be prepared according to methods used for the preparation of known analogs. For example, reagents of the formula

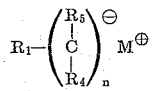

in which $R_1$ represents a biphenylyl radical or a monocyclic carbocyclic aryl radical, at least one of the radicals $R_4$ and $R_5$ stands for lower alkyl, $n$ represents 1 and $M^\oplus$ the positive ion of an alkali metal, especially a lithium ion, may be obtained by treating with lithium and at temperatures below 0° C. a dilute solution of an ether of the formula

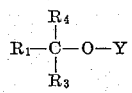

in which Y may stand for lower alkyl, e.g., methyl and the like, carbocyclic aryl, e.g., phenyl and the like, or a biphenylyl-lower alkyl or a monocyclic carbocyclic aryl-lower alkyl radical, e.g. the radical of the formula

in which $R_1$, $R_4$ and $R_5$ have the above-given meaning and the like, in an inert solvent, especially an ether, e.g., tetrahydrofurane, and in the atmosphere of nitrogen. Similarly, reagents of the formula

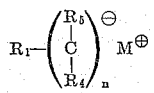

in which $R_4$ and $R_5$ have the previously-given meaning, $R_1$ represents a monocyclic heterocyclic aryl radical, $n$ stands for 1 and $M^\oplus$ represents the positive ion of an alkali metal, particularly a lithium ion, may be prepared by reacting the compound of the formula

with an organic alkali metal compound, such as, for example, phenyl sodium, phenyl lithium, n-butyl lithium and the like, preferably in the presence of an inert solvent, such as an ether, e.g., diethyl ether or tetrahydrofuran, or any other suitable inert solvent, and in the atmosphere of an inert gas, e.g., nitrogen.

However, for the introduction of a biphenylyl, a biphenylyl-lower alkyl, a monocyclic carbocyclic aryl or a monocyclic carbocyclic aryl-lower alkyl radical the use of a Grignard reagent, particularly a reagent of the formula

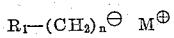

in which $R_1$ stands for a biphenylyl or a carbocyclic aryl radical, $n$ stands for 0, 1 or 2, and $M^\oplus$ represents the positive ion of the formula Met-Hal$^\oplus$, in which Met and Hal have the previously-given meaning, particularly of the formula Mg-Hal$^\oplus$, in which Hal has the above-given meaning, may be more appropriate. This procedure is also advantageous for reagents of the above formula, in which $R_1$ represents a monocyclic heterocyclic aryl radical and $n$ stands for 1, and particularly for 2. These Grignard reagents are known, or if new, may be prepared according to procedures used for the known ones.

Furthermore, certain ketones used as intermediates in the reaction of the invention, particularly those of the formula

in which $R_3$ has the previously-given meaning and $R_2$ represents a carbocyclic aryl radical, are known. Others, especially those in which $R_2$ represents a biphenylyl radical, and salts thereof are new and are intended to be included within the scope of the invention. Such novel ketones are primarily those of the formula

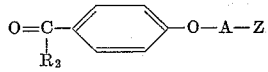

in which $R_2$ represents a biphenylyl radical of the formula

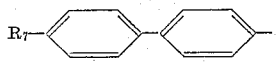

($R_7$ having the previously-given meaning), A stands for lower alkylene having from two to three carbon atoms and separating the group Z from the oxygen by from two to three carbon atoms, and Z stands for N,N-di-lower alkyl-amino, in which lower alkyl contains from one to four carbon atoms, and acid addition salts thereof.

The new ketones may be prepared, for example, by reacting an acid halide of the formula $R_2$—CO—Hal, in which $R_2$ and Hal have the previously-given meaning, or an acid halide of the formula $R_2'$—CO—Hal, in which Hal has the previously-given meaning and $R_2'$ represents a radical, which in the resulting product is capable of being converted into the desired radical $R_2$, with a compound of the formula $R_3$—H, in which $R_3$ has the previously-given meaning or a compound of the formula $R_3'$—H, in which $R_3'$ stands for a radical, which in the resulting product is capable of being converted into the desired radical $R_3$, in the presence of a Friedel-Crafts catalyst, and converting in any resulting product containing radicals $R_2'$ and/or $R_3'$, such radicals into the desired radicals $R_2$ and/or $R_3$, and/or, if desired, converting a resulting salt into a free compound, and/or, if desired, converting a free base into a salt thereof.

The reaction may be carried out according to the procedure known as the Friedel-Crafts reaction. Acid chlorides are particularly suitable starting materials, and aluminum chloride, aluminum bromide, stannic chloride and the like may be used as catalysts; inert solvents, such as carbon disulfide, nitrobenzene and the like, may serve as diluents.

In view of the fact that under the acidic conditions of the reaction etherified hydroxyl groups may be liberated, resulting compounds with free hydroxyl groups may be re-etherified, for example, according to methods shown hereinbelow.

The above reaction may be modified; thus, acid halides of the formulae $R_3$—CO—Hal or $R_3'$—CO—Hal, in which $R_3$, $R_3'$ and Hal have the previously-given meaning, may be reacted with compounds of the formulae $R_2$—H or $R_2'$—H, in which $R_2$ and $R_2'$ have the previously-given meaning, under the above conditions.

Ketones of the formula

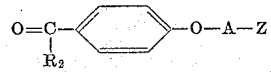

in which $R_2$ represents a biphenylyl radical, A stands for a lower alkylene radical containing from two to three carbon atoms and separating the group Z from the oxygen by from two to three carbon atoms, and Z represents N,N-di-lower alkyl-amino, in which lower alkyl contains from one to four carbon atoms, and salts thereof, may also be prepared by treating an ester of the formula

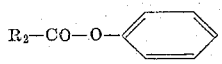

in which $R_2$ represents a biphenylyl radical, with a strong inorganic Lewis acid, and reacting the resulting phenolic ketone of the formula

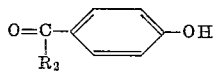

said phenolic ketone being preferably in the form of an alkali metal salt thereof, with a halide of the formula Hal—A—Z, in which A and Z have the previously-given meaning and Hal represents a halogen atom, particularly chlorine.

The rearrangement of the carboxylic acid ester to the phenolic ketone in the presence of a strong inorganic Lewis acid may be carried out according to the procedure known as the Fries Rearrangement (A. H. Blatt, Organic Reactions, vol. I, p. 342, 1942, Wiley, New York). A strong inorganic Lewis acid is primarily a halide of a polyvalent metal, particularly aluminum chloride, aluminum bromide, stannic chloride and the like; suitable solvents, if necessary, are, for example, carbon disulfide, nitrobenzene, or equivalent inert solvents.

The conversion of the resulting phenolic ketone into the starting material is preferably carried out by forming the alkali metal, e.g., sodium and the like, salt of the phenolic ketone, for example, by treatment with an alkali metal hydride, e.g., sodium hydride and the like, or an alkali metal amide, e.g., sodium amide and the like, in an inert solvent, such as, for example, p-dioxane or an equivalent inert solvent suitable for the preparation of such metal derivatives. The resulting salt is then reacted with the halide of the formula Hal—A—Z, in which A, Z and Hal have the above-given meaning, in an inert diluent, advantageously those used during the preparation of the salt.

The above etherification procedure may also be used to convert any free hydroxyl groups in compounds resulting from the Friedel-Crafts reaction previously described into etherified hydroxyl groups.

Ketones of the formula

in which $R_3$ has the previously-given meaning and $R_2$ represents a monocyclic heterocyclic aryl, particularly a pyridyl, radical, and acid addition salts thereof, particularly the ketones of the formula

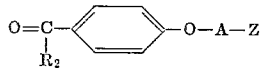

in which A and Z have the previously-given meaning and $R_2$ represents a monocyclic heterocyclic aryl, particularly a pyridyl, radical, may also be prepared according to the previously-outlined procedures, for example, by rearranging an ester of the formula

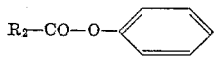

in which $R_2$ stands for a monocyclic heterocyclic aryl, particularly a pyridyl, radical, in the presence of a Lewis acid according to the Fries rearrangement reaction and etherifying a resulting phenolic ketone of the formula

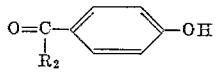

in which $R_2$ has the previously-given meaning, preferably in the form of an alkali metal, e.g., sodium, salt thereof with a reagent of the formula Hal—A—Z, in which A, Hal and Z have the previously-given meaning.

A modification of the procedure for the preparation of the compounds of this invention, particularly those of the formula

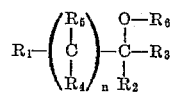

in which $R_1$, $R_3$, $R_4$, $R_5$ and $R_6$ have the previously-given meaning, and $R_2$ stands for a biphenylyl or a monocyclic carbocyclic aryl radical, with the proviso that at least one of the radicals $R_1$ and $R_2$ represents a biphenylyl radical, salts and quaternary ammonium compounds thereof, comprises reacting a ketone of the formula

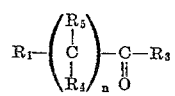

in which $R_1$, $R_3$, $R_4$, $R_5$ and $n$ have the above-given meaning, with a reagent of the formula

in which $M^{\oplus}$ stands for the positive ion of certain alkali metals (Group IA of the Periodic System), or more particularly, the positive ion of the formula Met-Hal$^{\oplus}$, in which Met and Hal have the previously-given meaning, particularly the ion of the Formula Mg-Hal$^{\oplus}$, and $R_2$ has the previously-given meaning, with the proviso that whenever $R_1$ in the ketone compound represents a monocyclic carbocyclic aryl or a monocyclic heterocyclic aryl radical, $R_2$ stands for a biphenylyl radical, and, if desired, carrying out the optional steps.

The reaction is carried out as shown hereinbefore, for example, according to the conditions of the Grignard reaction.

Although certain heterocyclic compounds form alkali metal or Grignard reagents, such as, for example, 2-pyridyl magnesium chloride or 3-pyridyl magnesium bromide, biphenylyl and monocyclic carbocyclic aryl metal reagents are advantageously used in the above modification of the general procedure. They can be prepared according to known methods, such as those previously described.

The ketones used as intermediates in the above modification are known, or, if new, may be prepared according to known procedures. For example, ketones of the formula

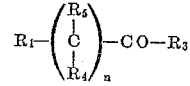

in which $R_1$, $R_3$, $R_4$, $R_5$ and $n$ have the previously-given meaning, may be prepared by reacting a reagent of the formula

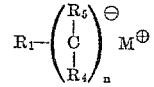

in which $R_1$, $R_4$, $R_5$ and $n$ have the above-given meaning and $M^{\oplus}$ represents the positive ion of an alkali metal, e.g., sodium, or particularly lithium, with an ester of the acid of the formula

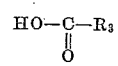

in which $R_3$ has the previously given meaning, with a lower alkanol, e.g., methanol, ethanol and the like. The preparation is carried out under known conditions, which are in general analogous to those employed in reactions involving organic metal reagents, as, for example, described hereinbefore.

A third modification of the procedure for manufacturing the compounds of this invention comprises reacting a ketone of the formula

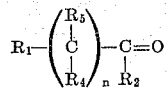

in which $R_1$, $R_2$, $R_4$, $R_5$ and $n$ have the previously-given meaning with a reagent of the formula

in which $R_3$ and $M^\oplus$ have the previously-given meaning and if desired, carrying out the optional steps.

In the above reaction the reagent $R_3^\ominus M^\oplus$ represents particularly a Grignard reagent, in which $M^\oplus$ stands primarily for the positive ion of the formula $Mg\text{-}Hal^\oplus$, in which Hal represents, for example, chlorine or bromine and the like. Such Grignard reagents may be prepared according to known methods, such as the "Method of Entrainment," described by Kharash and Reinmuth, Grignard Reactions of Nonmetallic Substances (Prentice-Hall, 1954), or by using a cyclic reactor as disclosed by Lawesson, Act. Chem. Scand., vol. 12, p. 1 (1958). The ketones are known, or, if new, may be prepared according to methods used for the known types.

If desired, the tertiary alcohol groups in the products resulting from the above-described procedure may be converted into the corresponding acyloxy groups. For example, the reactive functional derivative of a carboxylic acid and the tertiary alcohol are contacted in the presence of an organic base, for example, a tertiary amine, such as a tri-lower alkyl-amine, e.g., trimethylamine, N,N-dimethyl-N-ethyl-amine, N,N-diethyl-N-methyl-amine, triethyl-amine and the like, or N-benzyl-N,N-dimethyl-amine, dimethyl-aniline and the like, or a heterocyclic base, e.g., pyridine, collidine, lutidine and the like. The liquid bases may also serve as solvents, or other diluents may be added, such as for example, carbocyclic aryl hydrocarbons, e.g., benzene, toluene and the like, aliphatic hydrocarbons, e.g., pentane, hexane and the like, or ethers, e.g., diethyl ether and the like. Reactive functional derivatives of carboxylic acids are primarily acid anhydrides, such as acetic or propionic acid anhydride, and acid halides, particularly chlorides, which reagents may be used in the absence or in the presence of a diluent, such as a tertiary amine, or particularly a heterocyclic base, e.g., pyridine.

The esterification may also be accomplished by treating the alcohol with the anhydride of a carboxylic acid in the presence of an acid instead of the base; for example, sulfuric acid or perchloric acid may be utilized, preferably in catalytic amounts.

Additional esterification reagents are, for example, ketenes, e.g., ketene itself or substituted ketenes, which reagents furnish acetyl or substituted acetyl radicals. Such reaction is performed in an inert solvent, such as an aromatic hydrocarbon, e.g., toluene and the like.

The compounds of this invention may be obtained in the form of free bases or as the salts thereof. A salt may be converted into the free base, for example, by reaction with an alkaline reagent, such as, for example, aqueous alkali metal hydroxide, e.g., lithium, sodium or potassium hydroxide, aqueous alkali metal carbonate, e.g., sodium or potassium carbonate or hydrogen carbonate, or aqueous ammonia. A free base may be converted into its acid addition salts by reacting the former with one of the inorganic or organic acids mentioned hereinbefore; for example, a solution of the free base in a solvent, such as a lower alkanol, e.g., methanol, ethanol, propanol, isopropanol and the like, an ether, e.g., diethylether and the like, or a mixture of such solvents is treated with the acid or a solution thereof and the desired salt is recovered.

The salts may also be obtained as the hemihydrates, monohydrates, sesquihydrates or polyhydrates depending on the conditions of salt formation; mono- or poly-salts may be formed depending on the number of salt-forming groups.

The quaternary ammonium derivatives of the compounds of this invention may be obtained, for example, by reacting the tertiary base with a lower alkyl halide, e.g., methyl, ethyl, propyl or isopropyl chloride, bromide, iodide and the like, a lower alkyl lower alkane sulfonate, e.g., methyl or ethyl methane or ethane sulfonate and the like, or a lower alkyl lower hydroxy-alkane sulfonate, e.g., methyl 2-hydroxyethane sulfonate and the like. The quaternizing reactions may be performed in the presence of a solvent; suitable solvents are more especially lower alkanols, e.g., methanol, ethanol, propanol, isopropanol, butanol, pentanol and the like, lower alkanones, e.g., acetone, ethyl methyl ketone and the like, or organic acid amides, e.g., formamide or dimethyl-formamide and the like. If necessary, elevated temperature, pressure and/or the atmosphere of an inert gas, e.g., nitrogen, may be required.

Resulting quaternary ammonium compounds may be converted into the corresponding quaternary ammonium hydroxides, for example, by reacting a quaternary ammonium halide with silver oxide, or a quaternary ammonium sulfate with barium hydroxide, by treating quaternary ammonium salt with an anion exchanger, or by electro-dialysis. From a resulting quaternary ammonium hydroxide there may be prepared therapeutically acceptable quaternary ammonium salts by reacting the former with acids, for example, with those outlined hereinbefore for the preparation of the acid addition salts. Quaternary ammonium compounds may also crystallize as hydrates; mono- or poly-quaternary ammonium compounds may be formed depending on the number of tertiary amino groups present.

Resulting compounds containing more than one asymmetric carbon atom may be obtained as mixtures of racemic compounds or salts thereof, which may be separated into individual racemic compounds or salts thereof on the basis of physico-chemical differences, such as solubility, for example, by fractionated crystallization. Resulting racemates of the compounds of this invention may be resolved into optically active d- and l- forms according to procedures known for the resolution of racemic compounds. Thus to a solution of the free base of a racemic d, l-compound, for example, in a lower alkanol, e.g., methanol, ethanol and the like, may be added one of the optically active forms of an acid containing an asymmetric carbon atom, if desired, in solution, for example, in the same lower alkanol, whereupon a salt may be isolated, which is formed by the optically active acid with one of the optically active forms of the base. Especially useful as optically active forms of salt-forming acids are D- and L-tartaric acid; the optically active forms of dibenzoyl-tartaric, di-p-toluyl-tartaric, malic, mandelic, 10-camphor sulfonic or quinic acid may also be employed. From a resulting salt, the free and optically active base may be obtained according to processes used for the conversion of a salt into a base, for example, as outlined hereinbefore. An optically active base may then be converted into a therapeutically useful acid addition salt with one of the acids mentioned hereinbefore, or into a quaternary ammonium compound. The optically active forms may also be isolated by biochemical methods.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To 0.353 g. of magnesium in 20 ml. of ether is added a solution of 2.72 g. of 2-phenylethyl bromide in 20 ml. of ether while stirring; the formation of the Grignard reaction is initiated by adding 0.1 ml. of methyl iodide, and the halide is given to the mixture in such a rate so as to maintain refluxing condition. After refluxing for about one hour, 5.0 g. of 4-biphenylyl-4-(2-diethylaminoethoxy)-phenyl ketone in 25 ml. of ether is slowly added while cooling. The reaction mixture is refluxed for three hours and is then decomposed by adding a saturated aqueous solution of ammonium chloride. The two resulting layers are separated, the water phase is extracted twice with ether and twice with chloroform. The combined organic extracts are washed with a saturated aqueous solution of sodium chloride and dried over sodium sulfate. The solvents are evaporated; the residual oil crystallizes from a mixture of ether and pentane to yield the desired 1-(4-biphenylyl-1-[4-(2-diethylaminoethoxy)-phenyl]-3-phenyl-propanol, which is recrystallized from a mixture of ethanol and water, M.P. 119–120°; yield: 1.35 g.

A solution of the resulting free base in ethanol, when treated with hydrogen chloride in ether and diluted with ether, yields the desired 1-(4-biphenylyl)-1-[4-(2-diethylaminoethoxy)-phenyl]-3-phenyl-propanol hydrochloride.

The starting material used in the above reaction may be prepared as follows: To a solution of 43.2 g. of 4-methoxybenzoyl chloride and 40 g. of biphenyl in 250 ml. of benzene is added in small portions 75 g. of aluminum chloride. The mixture is cooled as soon as hydrogen chloride gas is evolved and cooling is maintained throughout the addition of the aluminum chloride. The reaction is then allowed to proceed at room temperature until the vigorous evolution of hydrogen chloride subsides. The mixture is refluxed for an additional four hours and the light brown liquid is poured onto a mixture of ice and concentrated aqueous hydrochloric acid. The solid material is filtered off, and dissolved in ethanol, which solution is filtered and diluted with water. The yellow crystalline material is filtered off, triturated with a 1:1-mixture of concentrated aqueous hydrochloric acid and water and the crystalline material is filtered off. The resulting 4-biphenylyl-4-hydroxy-phenyl ketone is recrystallized from a mixture of ethanol and water, M.P. 192–193°; yield: 47.4 g.

To a solution of 27.4 g. of 4-biphenylyl 4-hydroxyphenyl ketone in 150 ml. of dimethylformamide is slowly added a total of 4.8 g. of sodium hydride (52 percent strength) while stirring and cooling. After completion of the addition, 13.55 g. of 2-N,N-diethylaminoethyl chloride in 140.5 ml. of toluene is added; the mixture is refluxed for three hours and then allowed to stand overnight at room temperature. The mixture is filtered, most of the solvent is removed under reduced pressure and water is added to the residue. The aqueous mixture is extracted three times with ether, the extracts are washed with a saturated solution of sodium chloride in water and dried over sodium sulfate. The solvent is evaporated and the remaining orange oil crystallizes from petroleum ether to yield the desired 4-biphenylyl-4-(2-diethylaminoethoxy)-phenyl ketone, which melts at 60–61°.

*Example 2*

To a Grignard reagent prepared from 3.54 g. of 4-chlorobenzyl chloride and 0.528 g. of magnesium in 50 ml. ether is slowly added while cooling a solution of 7.46 4-biphenylyl 4-(2-diethylaminoethoxy)-phenyl ketone in 25 ml. of ether. The green reaction mixture is then refluxed for four hours and decomposed by adding a saturated aqueous solution of ammonium chloride. The two resulting layers are separated and the aqueous phase is extracted with ether and chloroform. The combined organic solutions are washed with saturated aqueous sodium chloride solution, dried over sodium sulfate, and evaporated to dryness. The remaining oil crystallizes from ether and the crystalline 1-(4-biphenylyl)-2-(4-chlorophenyl)-1-[4-(2-diethylaminoethoxy)-phenyl]-ethanol is recrystallized from a mixture of ethanol and water, M.P. 106–108°; yield: 3.4 g.

*Example 3*

A solution of 4.2 g. of α-picoline in 35 ml. of benzene is added to 2.56 g. of n-butyl lithium in 14.9 ml. of hexane while stirring and cooling and in an atmosphere of dry nitrogen. Stirring is continued for two hours; 7.46 g. of 4-biphenylyl 4-(2-diethylaminoethoxy)-phenyl ketone in 35 ml. of benzene is added slowly. After stirring for three additional hours at room temperature and standing over night, the dark solution is poured into ice water and the organic material is extracted with ether and chloroform. The combined organic phases are washed with a saturated aqueous solution of sodium chloride and then dried over sodium sulfate. The solvents are removed, the remaining orange oil is crystallized from pentane to yield the desired 1-(4-biphenylyl)-1-[4-(2-diethylaminoethoxy)-phenyl]-2-(2-pyridyl)-ethanol, which melts at 108–110° after recrystallization from ethanol and water.

Upon treating a solution of the 1-(4-biphenylyl)-1-[4-(2-diethylaminoethoxy)-phenyl]-2-(2-pyridyl)-ethanol in pyridine with propionic acid anhydride, the 1-(4-biphenylyl)-1-[4-(2-diethylaminoethoxy)-phenyl]-1-propionyloxy-2-(2-pyridyl)-ethane can be obtained.

Other compounds which may be prepared according to the previously-shown procedure, are, for example, 1-(4-biphenylyl)-1-[4-(3-diethylaminopropyloxy)-phenyl]-2-phenyl-ethanol,
1-(4-biphenylyl-1-[4-(2-diethylaminoethoxy)-phenyl]-2-(4-methoxyphenyl)-ethanol,
bis-(4-biphenylyl)-[4-(2-diethylaminoethoxy)-phenyl]-ethanol,
1-(4-biphenylyl-1-[4-(2-diethylaminoethoxy)-phenyl]-3-(4-methoxy-phenyl)-propanol,
1-(4-biphenyl)-1-[4-(2-diethylaminoethoxy)-phenyl]-2-(4-fluorophenyl)-ethanol,
1-(4-biphenylyl)-1-[4-(2-diethylaminoethoxy)-phenyl]-2-(2-thienyl)-ethanol,
1-(4-biphenylyl-1-[4-(2-diethoxyaminoethoxy)-phenyl]-2-(4-methyl-phenyl)-ethanol,
1-(4-biphenylyl)-2-(4-chlorophenyl)-1-{4-[2-(1-pyrrolidino)-ethoxy]-phenyl}-ethanol,
1-[4-(2-diethylaminoethyl)-phenyl]-1-(4′-methoxy-4-biphenylyl)-2-phenyl-ethanol,
1-(4′-bromo-4-biphenylyl)-1-[4-(2-diethylamino-ethoxy)-phenyl]-2-(4-methoxyphenyl)-ethanol,
4′-chloro-4-biphenylyl-[4-(2-diethylaminoethoxy)-phenyl]-phenyl-methanol,
2-(4-chlorophenyl)-1-[4-(2-diethylaminoethoxy)-phenyl]-1-(4′-methyl-4-biphenylyl)-ethanol,
1-(4-biphenylyl)-1-[4-(2-dimethylaminoethoxy)-phenyl]-2-(4-pyridyl)-ethanol,
1-(4-biphenylyl)-2-(3,4-dimethoxy-phenyl)-1-[4-(2-diethylaminoethoxy)-phenyl]-ethanol,
1-(4-biphenylyl)-2-(4-dimethylamino-phenyl)-1-[4-(2-diethylaminoethoxy)-phenyl]-ethanol,
1-(4-biphenylyl)-1-[4-(2-diethylaminoethoxy)-phenyl]-2-phenyl-propanol,
1-(4-biphenylyl)-1-[4-(2-diethylaminoethoxy)-phenyl]-2-(4-trifluoromethylphenyl)-ethanol, and the like. Starting materials, which may be used for the preparation of these compounds, such as, for example, 4-biphenylyl 4-(3-diethylaminopropyloxy)-phenyl ketone, 4-biphenylyl 4-[2-(1-pyrrolidino)-ethoxy]-phenyl ketone, 4-(2-diethylaminoethoxy)-phenyl 4'-methoxy-4-biphenylyl ketone,
4'-bromo-4-biphenylyl 4-(2-dimethylaminoethoxy)-phenyl ketone,
4'-chloro-4-biphenylyl 4-(2-dimethylaminoethoxy)-phenyl ketone,
4-(2-dimethylaminoethoxy)-phenyl 4-methyl-4-biphenylyl ketone,
4-biphenylyl 4-(2-dimethylaminoethoxy)-phenyl ketone
and the like, are being prepared according to the method shown in the previous examples.

Any functional groups attached to portions of a resulting compound may be converted into other functional groups; for example, a nitro group may be reduced to an amino group, a nitro or a primary amino group may be reductively alkylated to form secondary or tertiary amino groups, an amino group may be diazotized and converted to halogen according to the Sandmeyer method, etc.

What is claimed is:

1. A member selected from the group consisting of a compound of the formula

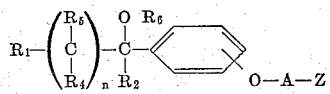

in which one of the radicals $R_1$ and $R_2$ is a member selected from the group consisting of biphenylyl, biphenylyl substituted by lower alkyl, biphenylyl substituted by lower alkoxy, biphenylyl substituted by halogeno, biphenylyl substituted by trifluoromethyl, phenyl, phenyl substituted by lower alkyl, phenyl substituted by lower alkoxy, phenyl substituted by halogeno, phenyl substituted by trifluoromethyl and pyridyl, and the other stands for a member of the group consisting of biphenylyl, biphenylyl substituted by lower alkyl, biphenylyl substituted by lower alkoxy and biphenylyl substituted by halogeno, the group A is lower alkylene having from two to seven carbon atoms and separating the group Z from the oxygen atom by at least two carbon atoms, Z is a member selected from the group consisting of N,N-di-lower alkyl-amino and N,N-alkylene-imino, in which alkylene has from four to six carbon atoms, each of the radicals $R_4$ and $R_5$ is a member selected from the group consisting of hydrogen and lower alkyl, $R_6$ is a member selected from the group consisting of hydrogen and the acyl radical of lower alkanoic acid, and $n$ is an integer from 0 to 2, and an addition salt thereof with a pharmaceutically acceptable acid.

2. Lower alkyl quaternary ammonium salts of the compounds of claim 1.

3. A compound of the formula

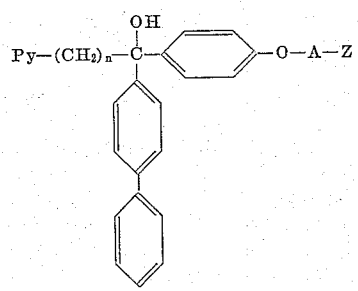

in which Py stands for pyridyl, Z stands for N,N-di-lower alkylamino and A for alkylene having from two to three carbon atoms and separating Z from the oxygen atom by from two to three carbon atoms, and $n$ is an integer from 0 to 2.

4. 1 - (4 - biphenylyl) - 1-[4-(2-diethylaminoethoxy)-phenyl]-2-(2-pyridyl)-ethanol.

5. A compound of the formula

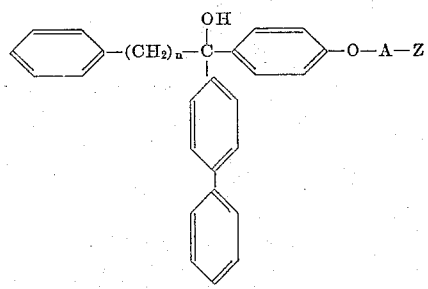

in which Z stands for N,N-di-lower alkyl-amino and A for alkylene having from two to three carbon atoms and separating Z from the oxygen atom by from two to three carbon atoms, and $n$ is an integer from 0 to 2.

6. 1 - (4 - biphenylyl) - 1-[4-(2-diethylaminoethoxy)-phenyl]-3-phenyl-propanol.

7. A compound of the formula

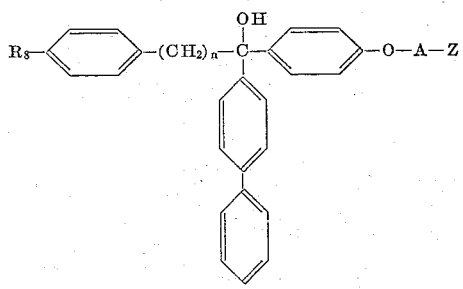

in which $R_8$ is lower alkyl, Z stands for N,N-di-lower alkyl-amino, and A for lower alkylene having from two to three carbon atoms and separating Z from the oxygen atom by from two to three carbon atoms, and $n$ is an integer from 1 to 2.

8. A compound of the formula

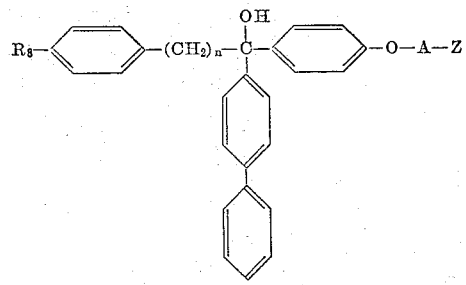

in which $R_8$ is lower alkoxy, Z stands for N,N-di-lower alkyl-amino, and A for lower alkylene having from two to three carbon atoms and separating Z from the oxygen atom by from two to three carbon atoms, and $n$ is an integer from 1 to 2.

9. A compound of the formula

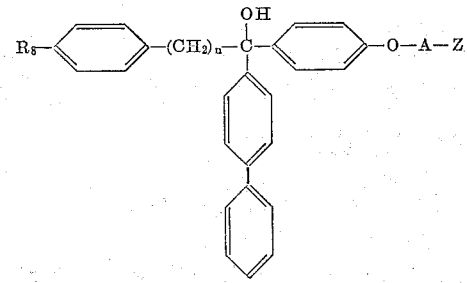

in which $R_8$ is halogeno, Z stands for N,N-di-lower alkyl-amino, and A for lower alkylene having from two to three carbon atoms and separating Z from the oxygen atom by from two to three carbon atoms, and $n$ is an integer from 0 to 2.

10. 1 - (4 - biphenylyl) - 2-(4-chloro-phenyl)-1-[4-(2-diethylaminoethoxy)-phenyl]-ethanol.

11. A compound of the formula

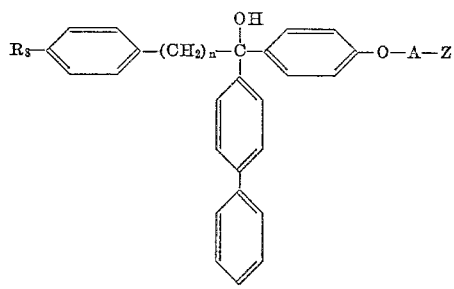

in which $R_8$ is halogeno-lower alkyl, Z stands for N,N-di-lower alkyl-amino, and A for lower alkylene having from two to three carbon atoms and separating Z from the oxygen atom by from two to three carbon atoms, and $n$ is an integer from 1 to 2.

12. A member selected from the group consisting of a compound of the formula

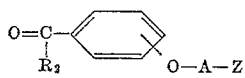

in which $R_2$ is a member of the group consisting of biphenylyl, biphenylyl substituted by lower alkyl, biphenylyl substituted by lower alkoxy, biphenylyl substituted by halogeno, and biphenylyl substituted by trifluoromethyl, the group A is lower alkylene having from two to seven carbon atoms and separating the group Z from the oxygen atom by at least two carbon atoms, and Z is a member selected from the group consisting of N,N-di-lower alkyl-amino and N,N-alkylene-imino, in which alkylene has from four to six carbon atoms, and an acid addition salt thereof.

13. A compound of the formula

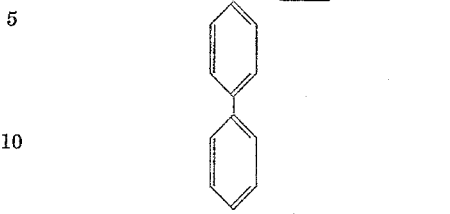

in which Z stands for N,N-di-lower alkyl-amino and A is lower alkylene having from two to three carbon atoms and separating the group Z from the oxygen by two to three carbon atoms.

14. 4 - biphenylyl 4 - (2 - diethylaminoethoxy)-phenyl ketone.

References Cited by the Examiner

UNITED STATES PATENTS 2,891,957   6/59   Allen et al. _____ 260—570.7 X

OTHER REFERENCES

Drake et al., Chemical Abstracts, vol. 41, pages 2018–19 (1947).

Hollander et al., Boston Medical Quarterly, vol. 10, pp. 37–44 (1959).

Mathieson et al., Chemical Abstracts, vol. 44, page 2949 (1950).

CHARLES B. PARKER, *Primary Examiner.*

DUVAL T. McCUTCHEN, LEON ZITVER, JOSEPH P. BRUST, *Examiners.*